United States Patent
Finn et al.

(10) Patent No.: US 10,928,362 B2
(45) Date of Patent: Feb. 23, 2021

(54) NONDESTRUCTIVE INSPECTION USING DUAL PULSE-ECHO ULTRASONICS AND METHOD THEREFOR

(71) Applicant: United Technologies Corporation, Farmington, CT (US)

(72) Inventors: Alan Matthew Finn, Hebron, CT (US); Amit Surana, West Hartford, CT (US); Matthew O. Williams, Honolulu, HI (US); Edgar A. Bernal, Webster, NY (US); Ozgur Erdinc, Mansfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 335 days.

(21) Appl. No.: 15/971,270

(22) Filed: May 4, 2018

(65) Prior Publication Data

US 2019/0339234 A1 Nov. 7, 2019

(51) Int. Cl.
*G01N 29/26* (2006.01)
*G01N 29/11* (2006.01)
*G01N 29/44* (2006.01)

(52) U.S. Cl.
CPC ............ *G01N 29/26* (2013.01); *G01N 29/11* (2013.01); *G01N 29/44* (2013.01); *G01N 2291/0289* (2013.01); *G01N 2291/044* (2013.01); *G01N 2291/048* (2013.01); *G01N 2291/10* (2013.01)

(58) Field of Classification Search
CPC ........ G01N 29/26; G01N 29/11; G01N 29/44; G01N 2291/0289; G01N 2291/044; G01N 2291/048

USPC .......................................................... 73/633
See application file for complete search history.

(56) References Cited

U.S. PATENT DOCUMENTS

| | | |
|---|---|---|
| 3,804,397 A | 4/1974 | Neumann |
| 4,402,053 A | 8/1983 | Kelley et al. |
| 4,403,294 A | 9/1983 | Hamada et al. |
| 4,873,651 A | 10/1989 | Raviv |
| 5,064,291 A | 11/1991 | Reiser |
| 5,119,678 A | 6/1992 | Bashyam et al. |

(Continued)

FOREIGN PATENT DOCUMENTS

| | | |
|---|---|---|
| CA | 2820732 A1 | 12/2014 |
| DE | 19710743 A1 | 9/1998 |

(Continued)

OTHER PUBLICATIONS

U.S. Final Office Action dated Jan. 3, 2019 for corresponding U.S. Appl. No. 15/971,254.

(Continued)

*Primary Examiner* — Tarun Sinha
(74) *Attorney, Agent, or Firm* — Bachman & LaPointe, P.C.

(57) ABSTRACT

A method for nondestructive inspection of a component, the method includes determining a first pulse-echo scan from a first side of a component; determining a second pulse-echo scan from a second side of the component; determining a through-transmission scan based on the first pulse-echo scan, the second pulse-echo scan, and a model of the component, the model comprises a rigid internal structure of the component; and classifying the component based on comparing the through-transmission scan to a "gold" model.

15 Claims, 3 Drawing Sheets

(56) References Cited

U.S. PATENT DOCUMENTS

| | | |
|---|---|---|
| 5,345,514 A | 9/1994 | Mandavieh et al. |
| 5,345,515 A | 9/1994 | Nishi et al. |
| 5,351,078 A | 9/1994 | Lemelson |
| 5,963,328 A | 10/1999 | Yoshida et al. |
| 6,023,637 A | 2/2000 | Liu et al. |
| 6,153,889 A | 11/2000 | Jones |
| 6,177,682 B1 | 1/2001 | Bartulovic et al. |
| 6,271,520 B1 | 8/2001 | Tao et al. |
| 6,399,948 B1 | 6/2002 | Thomas |
| 6,434,267 B1 | 8/2002 | Smith |
| 6,462,813 B1 | 10/2002 | Haven et al. |
| 6,690,016 B1 | 2/2004 | Watkins et al. |
| 6,737,648 B2 | 5/2004 | Fedder et al. |
| 6,759,659 B2 | 7/2004 | Thomas et al. |
| 6,804,622 B2 | 10/2004 | Bunker et al. |
| 6,907,358 B2 | 6/2005 | Suh et al. |
| 6,965,120 B2 | 11/2005 | Beyerer et al. |
| 7,026,811 B2 | 4/2006 | Roney, Jr. et al. |
| 7,064,330 B2 | 6/2006 | Raulerson et al. |
| 7,119,338 B2 | 10/2006 | Thompson et al. |
| 7,122,801 B2 | 10/2006 | Favro et al. |
| 7,129,492 B2 | 10/2006 | Saito et al. |
| 7,164,146 B2 | 1/2007 | Weir et al. |
| 7,190,162 B2 | 3/2007 | Tenley et al. |
| 7,220,966 B2 | 5/2007 | Saito et al. |
| 7,233,867 B2 | 6/2007 | Pisupati et al. |
| 7,240,556 B2 | 7/2007 | Georgeson et al. |
| 7,272,529 B2 | 9/2007 | Hogan et al. |
| 7,313,961 B2 | 1/2008 | Tenley et al. |
| 7,415,882 B2 | 8/2008 | Fetzer et al. |
| 7,446,886 B2 | 11/2008 | Aufmuth et al. |
| 7,489,811 B2 | 2/2009 | Brummel et al. |
| 7,602,963 B2 | 10/2009 | Nightingale et al. |
| 7,689,030 B2 | 3/2010 | Suh et al. |
| 7,724,925 B2 | 5/2010 | Shepard |
| 7,738,725 B2 | 6/2010 | Raskar et al. |
| 7,823,451 B2 | 11/2010 | Sarr |
| 7,966,883 B2 | 6/2011 | Lorraine et al. |
| 8,050,491 B2 | 11/2011 | Vaidyanathan |
| 8,204,294 B2 | 6/2012 | Alloo et al. |
| 8,208,711 B2 | 6/2012 | Venkatachalam et al. |
| 8,221,825 B2 | 7/2012 | Reitz et al. |
| 8,239,424 B2 | 8/2012 | Haigh et al. |
| 8,413,917 B2 | 4/2013 | Wang et al. |
| 8,449,176 B2 | 5/2013 | Shepard |
| 8,520,931 B2 | 8/2013 | Tateno |
| 8,528,317 B2 | 9/2013 | Gerez et al. |
| 8,692,887 B2 | 4/2014 | Ringermacher et al. |
| 8,744,166 B2 | 6/2014 | Scheid et al. |
| 8,761,490 B2 | 6/2014 | Scheid et al. |
| 8,781,209 B2 | 7/2014 | Scheid et al. |
| 8,781,210 B2 | 7/2014 | Scheid et al. |
| 8,792,705 B2 | 7/2014 | Scheid et al. |
| 8,913,825 B2 | 12/2014 | Taguchi et al. |
| 8,983,794 B1 | 3/2015 | Motzer et al. |
| 9,037,381 B2 | 5/2015 | Care |
| 9,046,497 B2 | 6/2015 | Kush et al. |
| 9,066,028 B1 | 6/2015 | Koshti |
| 9,080,453 B2 | 7/2015 | Shepard et al. |
| 9,116,071 B2 | 8/2015 | Hatcher, Jr. et al. |
| 9,134,280 B2 | 9/2015 | Cataldo et al. |
| 9,146,205 B2 | 9/2015 | Renshaw et al. |
| 9,151,698 B2 | 10/2015 | Jahnke et al. |
| 9,154,743 B2 | 10/2015 | Hatcher, Jr. et al. |
| 9,240,049 B2 | 1/2016 | Ciurea et al. |
| 9,251,582 B2 | 2/2016 | Lim et al. |
| 9,300,865 B2 | 3/2016 | Wang et al. |
| 9,305,345 B2 | 4/2016 | Lim et al. |
| 9,458,735 B1 | 10/2016 | Diwinsky et al. |
| 9,465,385 B2 | 10/2016 | Kamioka et al. |
| 9,467,628 B2 | 10/2016 | Geng et al. |
| 9,471,057 B2 | 10/2016 | Scheid et al. |
| 9,476,798 B2 | 10/2016 | Pandey et al. |
| 9,476,842 B2 | 10/2016 | Drescher et al. |
| 9,483,820 B2 | 11/2016 | Lim et al. |
| 9,488,592 B1 | 11/2016 | Maresca et al. |
| 9,519,844 B1 | 12/2016 | Thompson et al. |
| 9,594,059 B1 | 3/2017 | Brady et al. |
| 9,734,568 B2 | 5/2017 | Vajaria et al. |
| 9,785,919 B2 | 10/2017 | Diwinsky et al. |
| 9,804,997 B2 | 10/2017 | Sharp et al. |
| 9,808,933 B2 | 11/2017 | Lin et al. |
| 9,981,382 B1 | 5/2018 | Strauss et al. |
| 10,438,036 B1 | 10/2019 | Reome et al. |
| 2002/0121602 A1 | 9/2002 | Thomas et al. |
| 2002/0167660 A1 | 11/2002 | Zaslavsky |
| 2003/0117395 A1 | 6/2003 | Yoon |
| 2003/0205671 A1 | 11/2003 | Thomas et al. |
| 2004/0089811 A1 | 5/2004 | Lewis et al. |
| 2004/0089812 A1 | 5/2004 | Favro et al. |
| 2004/0139805 A1 | 7/2004 | Antonelli et al. |
| 2004/0201672 A1 | 10/2004 | Varadarajan et al. |
| 2004/0240600 A1 | 12/2004 | Freyer et al. |
| 2004/0245469 A1 | 12/2004 | Favro et al. |
| 2004/0247170 A1 | 12/2004 | Furze et al. |
| 2005/0008215 A1 | 1/2005 | Shepard |
| 2005/0113060 A1 | 5/2005 | Lowery |
| 2005/0151083 A1 | 7/2005 | Favro et al. |
| 2005/0167596 A1 | 8/2005 | Rothenfusser et al. |
| 2005/0276907 A1 | 12/2005 | Harris et al. |
| 2006/0012790 A1 | 1/2006 | Furze et al. |
| 2006/0078193 A1 | 4/2006 | Brummel et al. |
| 2006/0086912 A1 | 4/2006 | Weir et al. |
| 2007/0007733 A1 | 1/2007 | Hogarth et al. |
| 2007/0017297 A1 | 1/2007 | Georgeson et al. |
| 2007/0045544 A1 | 3/2007 | Favro et al. |
| 2008/0022775 A1 | 1/2008 | Sathish et al. |
| 2008/0053234 A1 | 3/2008 | Staroselsky et al. |
| 2008/0111074 A1 | 5/2008 | Weir et al. |
| 2008/0183402 A1 | 7/2008 | Malkin et al. |
| 2008/0229834 A1 | 9/2008 | Bossi et al. |
| 2008/0247635 A1 | 10/2008 | Davis et al. |
| 2008/0247636 A1 | 10/2008 | Davis et al. |
| 2009/0000382 A1 | 1/2009 | Sathish et al. |
| 2009/0010507 A1 | 1/2009 | Geng |
| 2009/0066939 A1 | 3/2009 | Venkatachalam et al. |
| 2009/0128643 A1 | 5/2009 | Kondo et al. |
| 2009/0252987 A1 | 10/2009 | Greene, Jr. |
| 2009/0279772 A1 | 11/2009 | Sun et al. |
| 2009/0312956 A1 | 12/2009 | Zombo et al. |
| 2010/0212430 A1* | 8/2010 | Murai .......... G01N 29/221 73/620 |
| 2010/0220910 A1 | 9/2010 | Kaucic et al. |
| 2011/0062339 A1 | 3/2011 | Ruhge et al. |
| 2011/0083705 A1 | 4/2011 | Stone et al. |
| 2011/0119020 A1 | 5/2011 | Key |
| 2011/0123093 A1 | 5/2011 | Alloo et al. |
| 2011/0299752 A1 | 12/2011 | Sun |
| 2011/0302694 A1 | 12/2011 | Wang et al. |
| 2012/0154599 A1 | 6/2012 | Huang |
| 2012/0188380 A1 | 7/2012 | Drescher et al. |
| 2012/0249959 A1 | 10/2012 | You et al. |
| 2012/0275667 A1 | 11/2012 | Lu |
| 2012/0293647 A1 | 11/2012 | Singh et al. |
| 2013/0028478 A1 | 1/2013 | St-Pierre et al. |
| 2013/0041614 A1 | 2/2013 | Shepard et al. |
| 2013/0070897 A1 | 3/2013 | Jacotin |
| 2013/0113914 A1 | 5/2013 | Scheid et al. |
| 2013/0113916 A1 | 5/2013 | Scheid et al. |
| 2013/0163849 A1 | 6/2013 | Jahnke et al. |
| 2013/0235897 A1 | 9/2013 | Bouteyre et al. |
| 2013/0250067 A1 | 9/2013 | Laxhuber et al. |
| 2014/0022357 A1 | 1/2014 | Yu et al. |
| 2014/0056507 A1 | 2/2014 | Doyle et al. |
| 2014/0098836 A1 | 4/2014 | Bird |
| 2014/0184786 A1 | 7/2014 | Georgeson et al. |
| 2014/0185912 A1 | 7/2014 | Lim et al. |
| 2014/0198185 A1 | 7/2014 | Haugen et al. |
| 2014/0200832 A1 | 7/2014 | Troy et al. |
| 2014/0350338 A1 | 11/2014 | Tanaka et al. |
| 2015/0041654 A1 | 2/2015 | Barychev et al. |
| 2015/0046098 A1 | 2/2015 | Jack et al. |
| 2015/0086083 A1 | 3/2015 | Chaudhry et al. |
| 2015/0128709 A1 | 5/2015 | Stewart et al. |

(56) References Cited

U.S. PATENT DOCUMENTS

| | | |
|---|---|---|
| 2015/0138342 A1 | 5/2015 | Brdar et al. |
| 2015/0185128 A1 | 7/2015 | Chang et al. |
| 2015/0233714 A1 | 8/2015 | Kim |
| 2015/0253266 A1 | 9/2015 | Lucon et al. |
| 2015/0314901 A1 | 11/2015 | Murray et al. |
| 2016/0012588 A1 | 1/2016 | Taguchi et al. |
| 2016/0043008 A1 | 2/2016 | Murray et al. |
| 2016/0109283 A1 | 4/2016 | Broussais-Colella et al. |
| 2016/0178532 A1 | 6/2016 | Lim et al. |
| 2016/0241793 A1 | 8/2016 | Ravirala et al. |
| 2016/0284098 A1 | 9/2016 | Okumura et al. |
| 2016/0314571 A1 | 10/2016 | Finn et al. |
| 2016/0328835 A1 | 11/2016 | Maresca, Jr. et al. |
| 2016/0334284 A1 | 11/2016 | Kaplun Mucharrafille et al. |
| 2017/0011503 A1 | 1/2017 | Newman |
| 2017/0023505 A1 | 1/2017 | Maione et al. |
| 2017/0052152 A1 | 2/2017 | Tat et al. |
| 2017/0085760 A1 | 3/2017 | Ernst et al. |
| 2017/0090458 A1 | 3/2017 | Lim et al. |
| 2017/0122123 A1 | 5/2017 | Kell et al. |
| 2017/0142302 A1 | 5/2017 | Shaw et al. |
| 2017/0184469 A1 | 6/2017 | Chang et al. |
| 2017/0184549 A1 | 6/2017 | Reed et al. |
| 2017/0184650 A1 | 6/2017 | Chang et al. |
| 2017/0211408 A1 | 7/2017 | Ahmadian et al. |
| 2017/0219815 A1 | 8/2017 | Letter et al. |
| 2017/0221274 A1 | 8/2017 | Chen et al. |
| 2017/0234837 A1 | 8/2017 | Hall et al. |
| 2017/0241286 A1 | 8/2017 | Roberts et al. |
| 2017/0258391 A1 | 9/2017 | Finn et al. |
| 2017/0262965 A1 | 9/2017 | Xiong et al. |
| 2017/0262977 A1 | 9/2017 | Finn et al. |
| 2017/0262979 A1 | 9/2017 | Xiong et al. |
| 2017/0262985 A1 | 9/2017 | Finn et al. |
| 2017/0262986 A1 | 9/2017 | Xiong et al. |
| 2017/0270651 A1 | 9/2017 | Bailey et al. |
| 2017/0297095 A1 | 10/2017 | Zalameda et al. |
| 2017/0284971 A1 | 11/2017 | Hall |
| 2018/0002039 A1 | 1/2018 | Finn et al. |
| 2018/0005362 A1 | 1/2018 | Wang et al. |
| 2018/0013959 A1 | 1/2018 | Slavens et al. |
| 2018/0019097 A1 | 1/2018 | Harada et al. |
| 2018/0098000 A1* | 4/2018 | Park .................. H04N 5/2258 |
| 2018/0111239 A1 | 4/2018 | Zak et al. |
| 2019/0299542 A1 | 10/2019 | Webb |
| 2019/0338666 A1 | 11/2019 | Finn et al. |
| 2019/0339131 A1 | 11/2019 | Finn et al. |
| 2019/0339165 A1 | 11/2019 | Finn et al. |
| 2019/0339206 A1 | 11/2019 | Xiong et al. |
| 2019/0339207 A1 | 11/2019 | Finn et al. |
| 2019/0339235 A1 | 11/2019 | Finn et al. |
| 2019/0340721 A1 | 11/2019 | Finn et al. |
| 2019/0340742 A1 | 11/2019 | Finn et al. |
| 2019/0340805 A1 | 11/2019 | Xiong et al. |
| 2019/0342499 A1 | 11/2019 | Xiong et al. |

FOREIGN PATENT DOCUMENTS

| | | |
|---|---|---|
| EP | 1961919 A2 | 8/2008 |
| GB | 2545271 A | 6/2017 |
| JP | 06235700 A | 8/1994 |
| JP | 2015161247 A | 9/2015 |
| SG | 191452 A1 | 7/2013 |
| WO | 2013088709 A1 | 6/2013 |
| WO | 2016112018 A1 | 7/2016 |
| WO | 2016123508 A1 | 8/2016 |
| WO | 2016176524 A1 | 11/2016 |

OTHER PUBLICATIONS

U.S. Non-Final Office Action dated Apr. 30, 2020 issued for corresponding U.S. Appl. No. 15/970,944.

Blachnio et al, "Assessment of Technical Condition Demonstrated by Gas Turbine Blades by Processing of Images of Their Surfaces", Journal of KONBiN, 1(21), 2012, pp. 41-50.

Raskar et al., 'A Non-photorealistic Camera: Depth Edge Detection and Stylized Rendering using Multi-flash Imaging' ACM Transactions on Graphics, 2004 http://www.merl.com/publications/docs/TR2006-107.pdf.

Feris et al., 'Specular Reflection Reduction with Multi-Flash Imaging', 17th Brazilian Symposium on Computer Graphics and Image Processing, 2004. http://rogerioferis.com/publications/FerisSIB04.pdf.

Holland, "First Measurements from a New Broadband Vibrothermography Measurement System", AIP Conference Proceedings, 894 (2007), pp. 478-483. http://link.aip.org/link/doi/10.1063/1.2718010 \.

Gao et al., 'Detecting Cracks in Aircraft Engine Fan Blades Using Vibrothermography Nondestructive Evaluation', RESS Special Issue on Accelerated Testing, 2014, http://dx.doi.org/10.1016/j.ress.2014.05.009.

Gao et al., 'A Statistical Method for Crack Detection from Vibrothermography Inspection Data', Statistics Preprints. Paper 68. http://lib.dr.iastate.edu/stat_las_preprints/68.

Holland, 'Thermographic Signal Reconstruction for Vibrothermography', Infrared Physics & Technology 54 (2011) 503-511.

Li et al., 'Statistical Methods for Automatic Crack Detection Based on Vibrothermography Sequence-of-Images Data', Statistics Preprints. Paper 69. http://lib.dr.iastate.edu/stat_las_preprints/69.

Tian et al., 'A Statistical Framework for Improved Automatic Flaw Detection in Nondestructive Evaluation Images', Technometrics, 59, 247-261.

Henneke et al. 'Detection of Damage in Composite Materials by Vibrothermography', ASTM special technical publication (696), 1979, pp. 83-95.

http://www.npl.co.uk/commercial-services/sector-case-studies/thermal-imaging-reveals-the-invisible.

U.S. Non-Final Office Action dated Nov. 29, 2019 for corresponding U.S. Appl. No. 15/971,242.

U.S. Non-Final Office Action dated Mar. 5, 2019 for corresponding U.S. Appl. No. 15/971,227.

Gao et al., 'A Statistical Method for Crack Detection from Vibrothermography Inspection Data',(2010) Statistics Preprints. Paper 68. http://lib.dr.iastate.edu/stat_las_preprints/68.

Li1 Ming; Holland1 Stephen D.; and Meeker1 William Q.1 "Statistical Methods for Automatic Crack Detection Based on Vibrothermography Sequence-of-Images Data" (2010). Statistics Preprints. 69.

Henneke et al. 'Detection of Damage in Composite Materials by Vibrothermography', ASTM special technical publication (696), American Society for Testing and Materials, 1979, pp. 83-95.

http://www.npl.co.uk/commercial-services/sector-case-studies/thermal-imaging-reveals-the-invisible; Apr. 17, 2012.

Tian et al., 'A Statistical Framework for Improved Automatic Flaw Detection in Nondestructive Evaluation Images', Technometrics, 59, 247-261. Feb. 1, 2017.

Emmanuel J. CAND'ES1,2, Xiaodong LI2, YI MA3,4, and John Wright4, "Robust Principal Component Analysis", (1)Department of Statistics, Stanford University, Stanford, CA; (2)Department of Mathematics, Stanford University, Stanford, CA; (3, 4) Electrical and Computer Engineering, UIUC, Urbana, IL (4) Microsoft Research Asia, Beijing, China, Dec. 17, 2009.

Sebastien Parent; "From Human to Machine: How to Be Prepared for Integration of Automated Visual Inspection"Quality Magazine, https://www.qualitymag.com/articles/91976. Jul. 2, 2014.

http://www.yxlon.com/products/x-ray-and-ct-inspection-systems/yxlon-mu56-tb, 2016.

U.S. Office action dated Jul. 23, 2018 issued in corresponding U.S. Appl. No. 15/971,254.

U.S. Non-Final Office Action dated Mar. 12, 2020 for corresponding U.S. Appl. No. 15/971,194.

U.S. Non-Final Office Action dated Apr. 16, 2019 for corresponding U.S. Appl. No. 15/970,985.

U.S. Non-Final Office Action dated Feb. 25, 2020 for corresponding U.S. Appl. No. 15/971,214.

(56) References Cited

OTHER PUBLICATIONS

E. J. Candès, X. Li, Y. Ma, and J. Wright, "Robust Principal Component Analysis", submitted. http://www-stat.stanford.edu/~candes/papers/RobustPCA.pdf.

M. Sznaier, O. Camps, N. Ozay, T. Ding, G. Tadmor and D. Brooks, "The Role of Dynamics in Extracting Information Sparsely Encoded In High Dimensional Data Streams", in Dynamics of Information Systems, Hirsch, M.J.; Pardalos, P. M.; Murphey, R. (Eds.), pp. 1-28, Springer Verlag, 2010.

M. Fazel, H. Hindi, and S. Boyd, "A Rank Minimization Heuristic with Application to Minimum Order System Approximation", American Control Conference, Arlington, Virginia, pp. 4734-4739, Jun. 2001.

Meola et al., 'An Excursus on Infrared Thermography Imaging', J. Imaging 2016, 2, 36 http://www.mdpi.com/2313-433X/2/4/36/pdf.

Yu et al., 'ASIFT: An Algorithm for Fully Affine Invariant Comparison', Image Processing on Line on Feb. 24, 2011. http://www.ipol.im/pub/art/2011/my-asift/article.pdf.

Schemmel et al., 'Measurement of Direct Strain Optic Coefficient of YSZ Thermal Barrier Coatings at Ghz Frequencies', Optics Express, v.25, n. 17, Aug. 21, 2017, https://doi.org/10.1364/OE.25.019968.

Jean-Yves Bouguet, "Camera Calibration Toolbox for Matlab", http://www.vision.caltech.edu/bouguetj/calib_doc/, accessed on Nov. 10, 2017.

https://www.qualitymag.com/articles/91976-from-human-to-machine-how-to-be-prepared-for-integration-of-automated-visual-inspection.

http://www.yxlon.com/products/x-ray-and-ct-inspection-systems/yxlon-mu56-tb.

Yu et al. 'Shadow Graphs and 3D Texture Reconstruction', IJCV, vol. 62, No. 1-2, 2005, pp. 35-60.

U.S. Non-Final Office Action dated Nov. 26, 2019 for corresponding U.S. Appl. No. 15/971,194.

U.S. Non-Final Office Action dated May 28, 2019 for corresponding U.S. Appl. No. 15/971,214.

U.S. Final Office Action dated Jul. 28, 2020 issued for corresponding U.S. Appl. No. 15/971,214.

U.S. Final Office Action dated Aug. 27, 2020 issued for corresponding U.S. Appl. No. 15/970,944.

U.S. Non-Final Office Action dated Aug. 28, 2020 issued for corresponding U.S. Appl. No. 15/971,194.

U.S. Non-Final Office Action dated Jun. 23, 2020 issued for corresponding U.S. Appl. No. 15/971,205.

U.S. Non-Final Office Action dated May 21, 2020 issued for corresponding U.S. Appl. No. 15/971,236.

\* cited by examiner

NONDESTRUCTIVE INSPECTION USING DUAL PULSE-ECHO ULTRASONICS AND METHOD THEREFOR

BACKGROUND

The present disclosure relates to nondestructive component inspection and, more particularly, to a nondestructive ultrasonic damage detection system for prognostics and health management, preventative maintenance, and repair of engine components.

Manufactured components may incur defects or imperfections during manufacturing or suffer wear and damage during operation. These components, therefore, are episodically or periodically inspected for defects and damage. One particular form of imperfection or damage consists of a "kissing bond" (also referred to as a zero-volume disbond) which is an interfacial or interstitial defect within a bond of a composite structure which shows no sign of separation at the interface. The defect is such that the opposing surfaces are substantially in contact with one another but are not bonded together. This may happen, for instance, when an adhesive begins to cure ("skins over") before the parts are mated. An interstitial defect in the adhesive greatly decreases the strength of the bond.

Traditional ultrasonic pulse echo (one-sided) techniques do not reliably detect kissing bonds because there is limited impedance mismatch (limited reflection coefficient) across the disbond. Ultrasonic through-transmission (two-sided) techniques are preferred since the attenuation across the disbond will produce a locally different, disbond-dependent, transmitted energy. This difference is typically small and relatively difficult to detect. The detection of the local difference may be improved by differential signal processing, by computing a difference between an expected energy, typically based on prior experimentation or a physics-based model, and the received energy. In the case of a proper bond, the difference is effectively zero; in the case of a disbond, the difference is non-zero.

The traditional through-transmission technique aligns a transmitter on one side of a component under inspection and receiver opposite the transmitter on the other side along a common axis orthogonal to the component. This technique effectively ignores the actual acoustic path through any internal structure of the component. In particular, when the internal structure is not orthogonal to the surface, the receiver may not be aimed at the emergence location of the transmitted sound energy.

SUMMARY

A method for nondestructive inspection of a component, the method according to one disclosed non-limiting embodiment of the present disclosure includes determining a first pulse-echo scan from a first side of a component; determining a second pulse-echo scan from a second side of the component; comparing the first pulse-echo scan to a first model from the first side of the component, the first model comprises a rigid internal structure of the component; comparing the second pulse-echo scan to a second model from the second side of the component, the second model comprises the rigid internal structure of the component; and classifying the component based on the comparing.

A further aspect of the present disclosure includes guiding a first pulse echo ultrasonic transducer in accords with the first model and a second pulse echo ultrasonic transducer in accords with the second model.

A further aspect of the present disclosure includes that the guiding comprises identifying a defect only within a predetermined area.

A further aspect of the present disclosure includes determining a defect in response to at least one of a difference between the first through-transmission scan and a first gold model and a difference between the second through-transmission scan and a second gold model.

A further aspect of the present disclosure includes that the guiding aligns the first pulse-echo ultrasonic transducer and the second pulse-echo ultrasonic transducer along a path of maximum energy transmission.

A further aspect of the present disclosure includes that the guiding comprises defining a predetermined area adjacent the rigid internal structure of the component.

A further aspect of the present disclosure includes that the defining the predetermined area is associated with a side of the component.

A further aspect of the present disclosure includes that classifying the component comprises identifying a delamination area.

A further aspect of the present disclosure includes at least one of a through-transmission scan from the first side of the component to the second side of the component using the first model; and a through-transmission scan from the second side of the component to the first side of the component using the second model.

A method for nondestructive inspection of a component, the method according to one disclosed non-limiting embodiment of the present disclosure includes guiding a first pulse echo ultrasonic transducer in accords with a first model of a component and a second pulse echo ultrasonic transducer in accords with a second model of the component; determining a first pulse-echo scan from a first side of a component; determining a second pulse-echo scan from a second side of the component; and identifying a defect only from within a predetermined area of the component based on the first model and the second model.

A further aspect of the present disclosure includes that the predetermined area is an area that includes a rigid internal structure.

A further aspect of the present disclosure includes comparing the first pulse-echo scan to the first model from the first side of the component; and comparing the second pulse-echo scan to the second model from the second side of the component.

A further aspect of the present disclosure includes determining a difference between the first pulse-echo scan to a first gold model; and determining a difference between the second pulse-echo scan to a second gold model.

A further aspect of the present disclosure includes orienting the first model and the second model with respect to the component based on an edge of the model and an edge of the component.

A further aspect of the present disclosure includes that the first model and the second model are at least one of an as-designed model, an as-built model, and a previous condition model.

A nondestructive inspection system to inspect a component, the system according to one disclosed non-limiting embodiment of the present disclosure includes a first pulse echo ultrasonic transducer to provide a first pulse-echo scan from a first side of a component, the first pulse echo ultrasonic transducer operable to receive a through-transmission from the second pulse echo ultrasonic transducer; a second pulse echo ultrasonic transducer to provide a second pulse-echo scan from a second side of the component, the second pulse echo ultrasonic transducer operable to receive a through-transmission from the first pulse echo ultrasonic transducer; and a controller in communication with the first pulse echo ultrasonic transducer and the second pulse echo ultrasonic transducer, the controller operable to identify a defect within a predetermined area of the component based on at least one of a difference between the first through-transmission scan and a first gold model and a difference between the second through-transmission scan and a second gold model.

A further aspect of the present disclosure includes a database, the database identifies a location of an internal structure of the component from a perspective of the component associated with the first model and the second model.

A further aspect of the present disclosure includes wherein the first model and the second model are at least one of an as-designed model, an as-built model, and a previous condition model.

A further aspect of the present disclosure includes a first position control to position the first pulse echo ultrasonic transducer guided by the controller in response to the first model, and a second position control to position the second pulse echo ultrasonic transducer guided by the controller in response to the second model.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
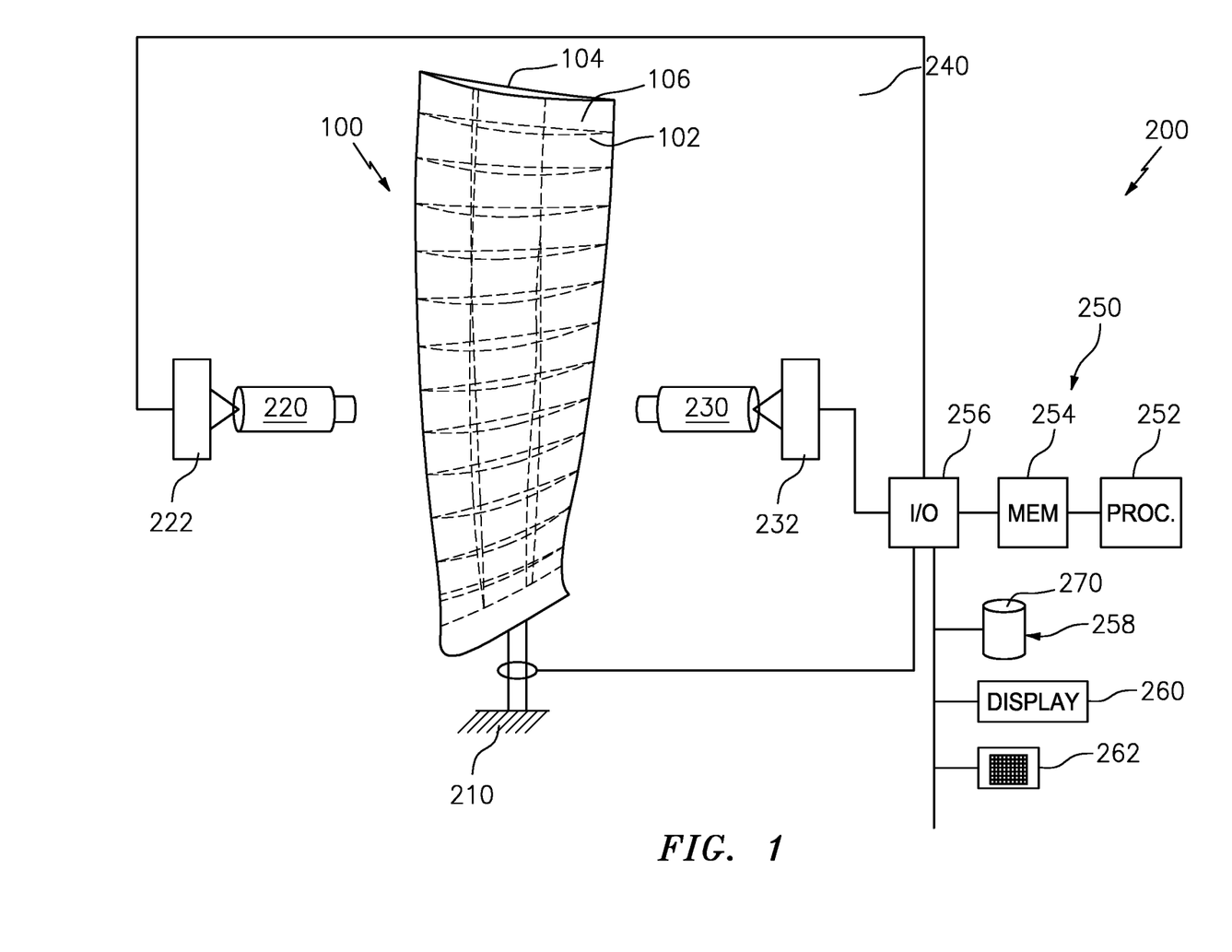
FIG. 1 is a schematic view of a nondestructive ultrasonic damage detection system.

FIG. 1 schematically illustrates a nondestructive ultrasonic damage detection system 200. The system 200 utilizes models of internal component structure to guide the detection, computation of shape features, and classification of defects based on those shape features. The techniques are particularly applicable to composite material manufacturing defects such as disbonding or delamination within a component 100. The component 100, for example a fan blade of a gas turbine engine, may have a substrate 102, a cover 104, and a rigid internal structure 106. In this example, the cover 104 is bonded to the internal structure 106 which, in turn, is either bonded to, or is an integral part of, the substrate 102. While this disclosure is taught with respect to a fan blade, it is explicitly contemplated that the teaching herein is applicable to both natural and manufactured composite objects with internal structure.

The nondestructive ultrasonic damage detection system 200 includes a fixture 210 to retain the component 100, a first pulse echo ultrasonic transducer 220, a first position control 222 to position the first pulse echo ultrasonic transducer 220, a second pulse echo ultrasonic transducer 230, a second position control 232 to position the second pulse echo ultrasonic transducer 230, and a control system 250. The first and second pulse echo ultrasonic transducers 220, 230 transmit short-duration ultrasound pulses into the region to be studied, and echo signals resulting from scattering and reflection are detected and may be processed and displayed. Pulse echo ultrasonic transducers 220, 230, respectively, may also receive through-transmission ultrasonic pulses from pulse echo ultrasonic transducers 230, 220, respectively. Since an ultrasonic transmitter is also effectively an ultrasonic receiver, no additional hardware is needed for pulse echo ultrasonic transducers 220, 230 to operate as bi-directional through-transmission hardware.

The first and second position control 222, 232 may be a computer numerical control (CNC) robotic manipulator system that moves the first and second pulse echo ultrasonic transducer 220, 230 in response to the control system 250. The control system 250 may include hardware, firmware, and/or software components that are configured to perform the functions disclosed herein, including the operation of the first and second positon control 222, 232. While not specifically shown, the control system 250 may include other computing devices (e.g., servers, mobile computing devices, and the like) and computer aided manufacturer (CAM) systems which may be in communication with each other and/or the control system 250 via a communication network to perform one or more of the disclosed functions. The control system 250 may include at least one processor 252 (e.g., a controller, microprocessor, microcontroller, digital signal processor, and the like), memory 254, and an input/output (I/O) subsystem 256. The control system 250 may be embodied as any type of computing device (e.g., a workstation, an embedded computer, an FPGA, a tablet computer, smart phone, body-mounted device or wearable device, and the like, a server, an enterprise computer system, a network of computers, a combination of computers and other electronic devices, or other electronic devices). Although not specifically shown, the I/O subsystem 256 typically includes, for example, an I/O controller, a memory controller, and one or more I/O ports. The processor 252 and the I/O subsystem 256 are communicatively coupled to the memory 254. The memory 254 may be embodied as any type of computer memory device (e.g., volatile memory such as various forms of random access memory).

The I/O subsystem 256 may also be communicatively coupled to a number of hardware, firmware, and/or software components, including a data storage device 258, a display 260, and a user interface (UI) subsystem 262. The data storage device 258 may include one or more hard drives or other suitable persistent storage devices (e.g., flash memory, memory cards, memory sticks, and/or others). A database 270 for models of the component may reside at least temporarily in the data storage device 258 and/or other data storage devices (e.g., data storage devices that are "in the cloud" or otherwise connected to the control system 250 by a network). The models of the component 100 may be an as-designed model, an as-built model, a previous condition model, and the like.

Figure 2:
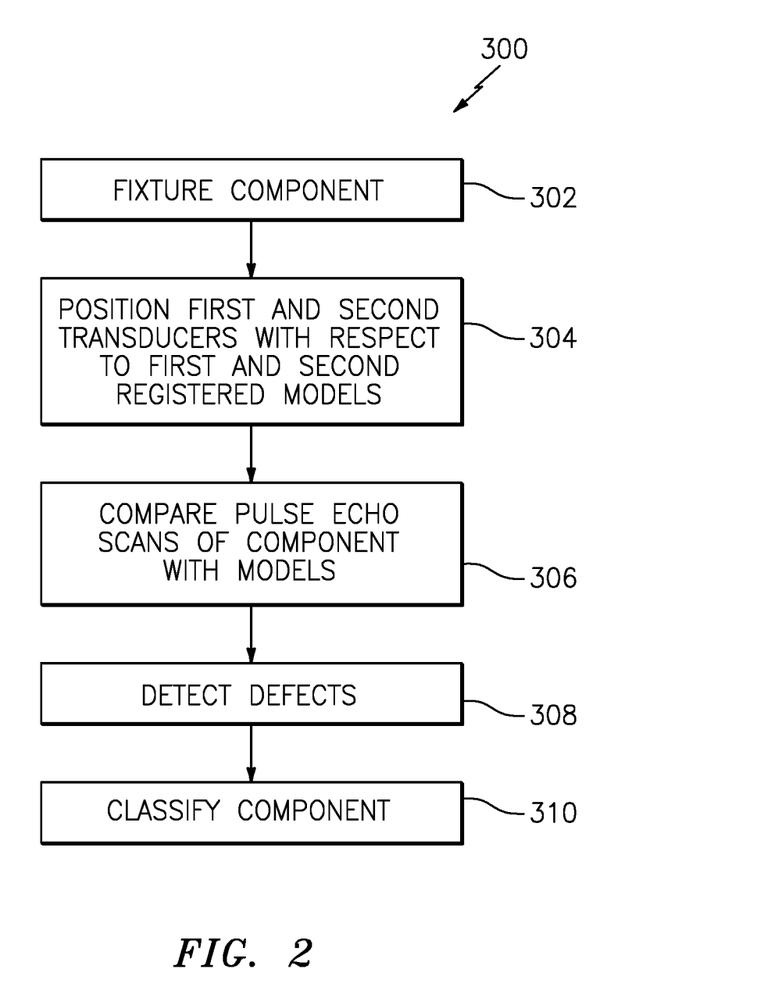
FIG. 2 is a block diagram representing a method of inspection using the nondestructive ultrasonic damage detection system.
Figure 3:
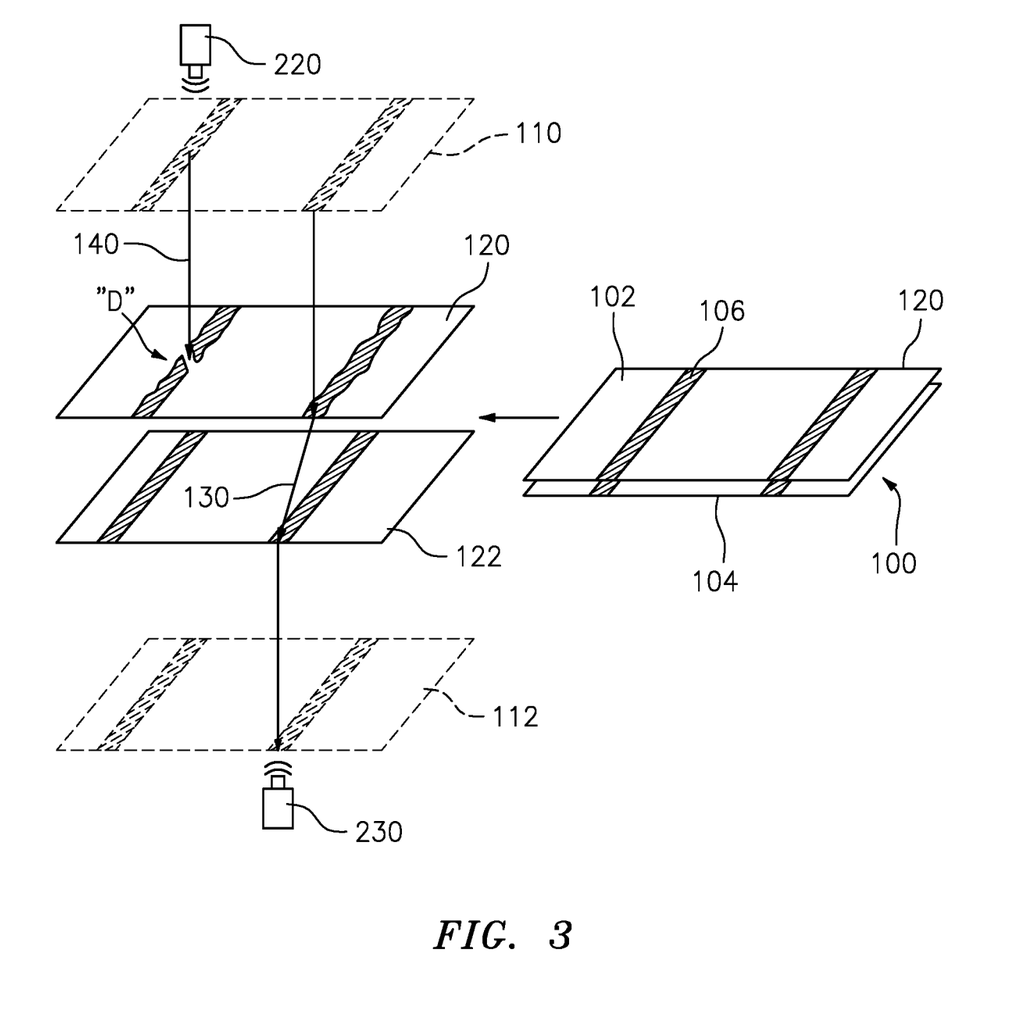
FIG. 3 is a representation of the method of inspection.

With reference to FIGS. 2 and 3, one disclosed non-limiting embodiment of a method 300 for nondestructive component inspection initially includes locating the component in the fixture 210 of the system 200 (step 302). Although a fan blade of a gas turbine engine is illustrated as the representative example component, any such composite component can be inspected by the system 200.

Next, the first positon control 222 positons the first pulse echo ultrasonic transducer 220 to determine a first pulse-echo scan 120 from a first side of the component 100 and a second positon control 232 positons the second pulse echo ultrasonic transducer 230 from a second side of the component 100. The first and second positon control 222, 232 move the respective first and second pulse echo ultrasonic transducer 220, 230 guided by the control system 250 in response to a first registration model 110 of the first side of the component and a second registration model 112 of the second side of the component. The models 110, 112 include the rigid internal structure 106 such that predetermined areas can be delineated in association therewith. That is, the predetermined areas identify the location of the rigid internal structure 106 from the associated sides of the component 100 to isolate particular areas which both transmit ultrasonic energy and may be subject to defects such as disbonding and/or delamination.

The internal structure 106 is registered via one or more models 110, 112 of the component 100. Multiple models may be required since the rigid internal structure 106 on one side of component 100 need not be directly aligned with the rigid internal structure 106 on the other side of component 110. The registered structural models to both front and back pulse-echo images allow guidance of the first and second pulse echo ultrasonic transducer 220, 230 and reasoning about expected through-transmission acoustic energy for defect detection.

The models may be an as-designed model, an as-built model, a previous condition model, and the like. The registration may make use of edges of the composite component 100 to scale, rotate, and or translate the model to elucidate the internal structure 106 from the perspective of the first and second pulse echo ultrasonic transducer 220, 230 for automated reasoning about the predetermined areas at which a defect may occur. That is, the registered models may be used to constrain detection of defects in the pulse-echo scans 120, 122 or the corresponding through-transmission scans (one direction shown: 130, 140) to only the predetermined areas. The registered models may also be used to guide the first and second pulse echo ultrasonic transducer 220, 230 since, for efficient inspection speed, only the predetermined areas adjacent to the rigid internal structure 106 may need to be scanned.

The predetermined areas with the rigid internal structure 106 from the models are used to influence the detection of damage, particularly where the damage manifests as a 'distorted pattern' in the pulse-echo or through-transmission scan. This influencing of the detection of damage may be based on, for example, the known internal structure, as initialization of an active contour shape determination, a geometric restriction for the predetermined area over which statistical characterization is performed, as priors in a Bayesian estimation, or other technique that limits portions of the pulse-echo scan. For example, a disbond may be detected because it appears at a particular location with respect to the known location of the rigid internal structure 106 where the identical pulse-echo scan imagery that is not at a known location of the rigid internal structure 106 may be ignored.

The through-transmission excitation is largely carried by the rigid internal structure 106 and, by using the models 110, 112, the expected energy transmission may be compared to the actual energy transmission for the detection of defects as represented by the interrupted energy path "D" in the through-transmission scan 140 due to a defect.

The pulse-echo scan 120 of the first side of the component produces pulse-echo scan imagery substantially representing the top of the internal structure 106. Likewise, the pulse-echo scan 122 of the back of the component 100 produces an image substantially representing the bottom of the internal structure 106. The models 110, 112 of the top (bottom) structure may be registered to the respective top (bottom) pulse-echo scan imagery using, for instance, a random consensus (RANSAC) algorithm based on computed features where the features may include SIFT, SURF, ASIFT, other SIFT variants, Harris Corner features, SUSAN, FAST, a Phase Correlation, a Normalized Cross-Correlation, GLOH, BRIEF, CenSure/STAR, ORB, and the like. Alternatively, or in addition, the models 110, 112 may be used to separately guide an acoustically-aligned through-transmission scan (one direction shown: 130, 140) where the transducers are aligned along the acoustic transmission path rather than being simply opposite each other along an axis orthogonal to the component.

The pulse-echo or through-transmission scans may be normalized and compared (step 306) with the models in the database 270 to initialize or constrain detection of damage in the pulse-echo or through-transmission scan features to only the relevant area or shape. The pulse-echo or through-transmission scans of the subject component may be normalized to account for overall differences in excitation energy, different gain in the transmitter or receiver, and the like.

In order to correctly interpret the pulse-echo or through-transmission scan imagery, both the internal structure 106 and how any defects (step 308) may manifest are guided by the models 110, 112. In embodiments, the pulse-echo scans are used for guidance, while through-transmission may be used for damage detection. Alternatively, pulse-echo may be used for damage detection. In embodiments, the detection of defects may use a difference between the through-transmission of the subject component and a "gold model" scan derived from previous experimentation, an expected energy model derived from the physics of acoustic transmission, and the like. In one example, the gold model may be derived from the through-transmission data. For example, the gold model may be those data values within a predetermined number of standard deviations from the mean of the data values. The difference may be analyzed by a statistical detector (hypothesis detector) where one hypothesis is that the differential energy is zero and the other hypothesis is that the differential energy is non-zero.

In another embodiment, other statistical detection or regression techniques may be employed such as principal components analysis (PCA), robust PCA (RPCA), support vector machines (SVM), linear discriminant analysis (LDA), expectation maximization (EM), Boosting, Dictionary Matching, maximum likelihood (ML) estimation, maximum a priori (MAP) estimation, least squares (LS) estimation, non-linear LS (NNLS) estimation, Bayesian Estimation, and the like. Additional morphological filtering may be used to effectively ignore very small detections that may result from noise or that would not significantly affect bond strength and component reliability.

In yet another embodiment, defects can be detected via a deep learning classifier trained from available data, such as a library of user characterized damage examples stored within the database 270. Deep learning is the process of training or adjusting the weights of a deep neural network. In one example, the deep neural network is a deep convolutional neural network trained by presenting an error map or partial error map to an input layer and a damage/nodamage label to an output layer. The training of a deep convolutional network proceeds layer-wise and does not require a label until the output layer is trained. The weights of the deep network's layers are adapted, typically by a stochastic gradient descent algorithm, to produce a correct classification. The deep learning training may use only partially labeled data, only fully labeled data, or only implicitly labeled data, or may use unlabeled data for initial or partial training with only a final training on labeled data.

The component may then be classified (step 310) based on the defect determination into binary (e.g. reject, accept) or multi-class categories (e.g., a score), using algorithms such as a logistics regression, nearest neighbor metrics, deep neural networks, Bayesian estimation, support vector machines, decision trees, random forests, and the like.

The nondestructive ultrasonic damage detection system 200 permits inspection of components to detect defects by registering a model and constraining the analytics based on the model. The nondestructive ultrasonic damage detection system 200 facilitates automated inspection that reduces cost of poor quality (COPQ) from faulty human visual inspection; reduces turn-backs from subsequent inspector disagreement; reduces dependence on increasingly scarce skilled inspectors; reduces inspection time and cost, increases inspector efficiency; and gathers machine-readable data on component condition for repair scheduling, life estimation, (re)design, and training.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward", "aft", "upper", "lower", "above", "below", and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method for nondestructive inspection of a component, the method comprising:
   guiding a first and a second pulse echo ultrasonic transducer along predetermined areas adjacent to a rigid internal structure of the component;
   determining a first pulse-echo scan from a first side of the component;
   determining a second pulse-echo scan from a second side of the component;
   comparing the first pulse-echo scan to a first model from the first side of the component, the first model comprises the rigid internal structure of the component;
   comparing the second pulse-echo scan to a second model from the second side of the component, the second model comprises the rigid internal structure of the component, the first and second models each comprise data values within a predetermined number of standard deviations from a mean of the data values; and
   classifying the component based on a difference between the first pulse-echo scan and the first model and the second pulse-echo scan and the second model, wherein classifying the component comprises identifying a delamination area within the predetermined areas.

2. The method as recited in claim 1, wherein the guiding aligns the first pulse-echo ultrasonic transducer with respect to the second pulse-echo ultrasonic transducer along a path of maximum energy transmission.

3. The method as recited in claim 1, wherein the guiding comprises the predetermined area adjacent the rigid internal structure of the component.

4. The method as recited in claim 2, wherein the predetermined area is associated with a side of the component.

5. The method as recited in claim 1, further comprising at least one of
   a through-transmission scan from the first side of the component to the second side of the component using the first model; and
   a through-transmission scan from the second side of the component to the first side of the component using the second model.

6. A method for nondestructive inspection of a component, the method comprising:
   guiding a first and a second pulse echo ultrasonic transducer along predetermined areas of the component;
   determining a first pulse-echo scan from a first side of a component from the first pulse echo ultrasonic transducer;
   determining a second pulse-echo scan from a second side of the component from the second pulse echo ultrasonic transducer; and
   identifying a delamination area only from within the predetermined area of the component in response to the a difference between the through-transmission of the first pulse-echo scan and the first model and the second pulse-echo scan and the second model, the first and second models each comprise data values within a predetermined number of standard deviations from a mean of the data values.

7. The method as recited in claim 6, wherein the predetermined area is an area that includes a rigid internal structure of the component.

8. The method as recited in claim 6, wherein identifying the delamination area comprises:

comparing the first pulse-echo scan to the first model from the first side of the component; and comparing the second pulse-echo scan to the second model from the second side of the component.

9. The method as recited in claim 8, wherein identifying the delamination area comprises:

determining a difference between the first pulse-echo scan to the first model; and determining a difference between the second pulse-echo scan to the second model.

10. The method as recited in claim 6, further comprising orienting the first model and the second model with respect to the component based on an edge of the model and an edge of the component.

11. The method as recited in claim 6, wherein the first model and the second model are at least one of an as-designed model, an as-built model, and a previous condition model.

12. A nondestructive inspection system to inspect a component, the system comprising:

a first pulse echo ultrasonic transducer to provide a first pulse-echo scan from a first side of a component, the first pulse echo ultrasonic transducer operable to receive a through-transmission from the second pulse echo ultrasonic transducer;

a second pulse echo ultrasonic transducer to provide a second pulse-echo scan from a second side of the component, the second pulse echo ultrasonic transducer operable to receive a through-transmission from the first pulse echo ultrasonic transducer;

a database that identifies a location of an internal structure of the component from a perspective of a first model and a second model;

a controller in communication with the first pulse echo ultrasonic transducer and the second pulse echo ultrasonic transducer, the controller operable to identify a defect within a predetermined area of the component in response to a difference between a first through-transmission scan from the first pulse echo ultrasonic transducer and the first model and a difference between a second through-transmission scan from the second pulse echo ultrasonic transducer and the second model; and a first position control to position the first pulse echo ultrasonic transducer guided by the controller in response to the first model along an internal structure of the component, and a second position control to position the second pulse echo ultrasonic transducer guided by the controller in response to the second model along the internal structure of the component.

13. The system as recited in claim 12, wherein the first model and the second model are at least one of an as-designed model, an as-built model, and a previous condition model.

14. The system as recited in claim 12, wherein the first model and the second model are "gold" model scans derived from previous experimentation.

15. The system as recited in claim 14, wherein the "gold" model scans contain data values within a predetermined number of standard deviations from a desired mean of the data values.

* * * * *